United States Patent

Buhler et al.

[11] 4,346,411
[45] Aug. 24, 1982

[54] AMPLITUDE SENSITIVE THREE-LEVEL DETECTOR FOR DERIVATIVE READ BACK CHANNEL OF MAGNETIC STORAGE DEVICE

[75] Inventors: Otto R. Buhler, Boulder; Homer J. Gardner, Longmont, both of Colo.; Peter T. Marino, Tucson, Ariz.

[73] Assignee: International Business Machines Corporation, Armonk, N.Y.

[21] Appl. No.: 234,519

[22] Filed: Feb. 17, 1981

[51] Int. Cl.³ ............................ G11B 5/09; G11B 5/02
[52] U.S. Cl. ........................................ 360/46; 360/67
[58] Field of Search ............................ 360/46, 67, 40

[56] References Cited

U.S. PATENT DOCUMENTS

| | | | |
|---|---|---|---|
| 3,581,297 | 5/1971 | Behr et al. | 360/40 |
| 3,821,716 | 6/1974 | Ghajar | 360/40 |
| 4,298,898 | 11/1981 | Cardot | 360/67 |

*Primary Examiner*—Vincent P. Canney
*Attorney, Agent, or Firm*—R. E. Cummins

[57] ABSTRACT

A system for reading information stored on a flexible magnetic disk is disclosed. The system involves an amplitude detector for detecting at predetermined times whether the amplitude of the read signal is positive, zero or negative. This system includes an amplifier for the differential raw data signal whose gain is variable in response to changes in the amplitude of the raw data signal which occur over a relatively long period. The output of the automatic gain control amplifier is an equalized differential signal applied to the detector and to a threshold generator which provides an output reference signal which is a predetermined percentage of the input signal, and which is capable of following relatively rapid changes in the amplitude of the input signal. A positive and negative comparator circuit continually compares the differential equalized data signal against the generated threshold reference signal. The outputs of these comparators are sampled at clock times established from a phase-locked loop which is synchronized by pulses derived from the peaks of the input data signal.

7 Claims, 8 Drawing Figures

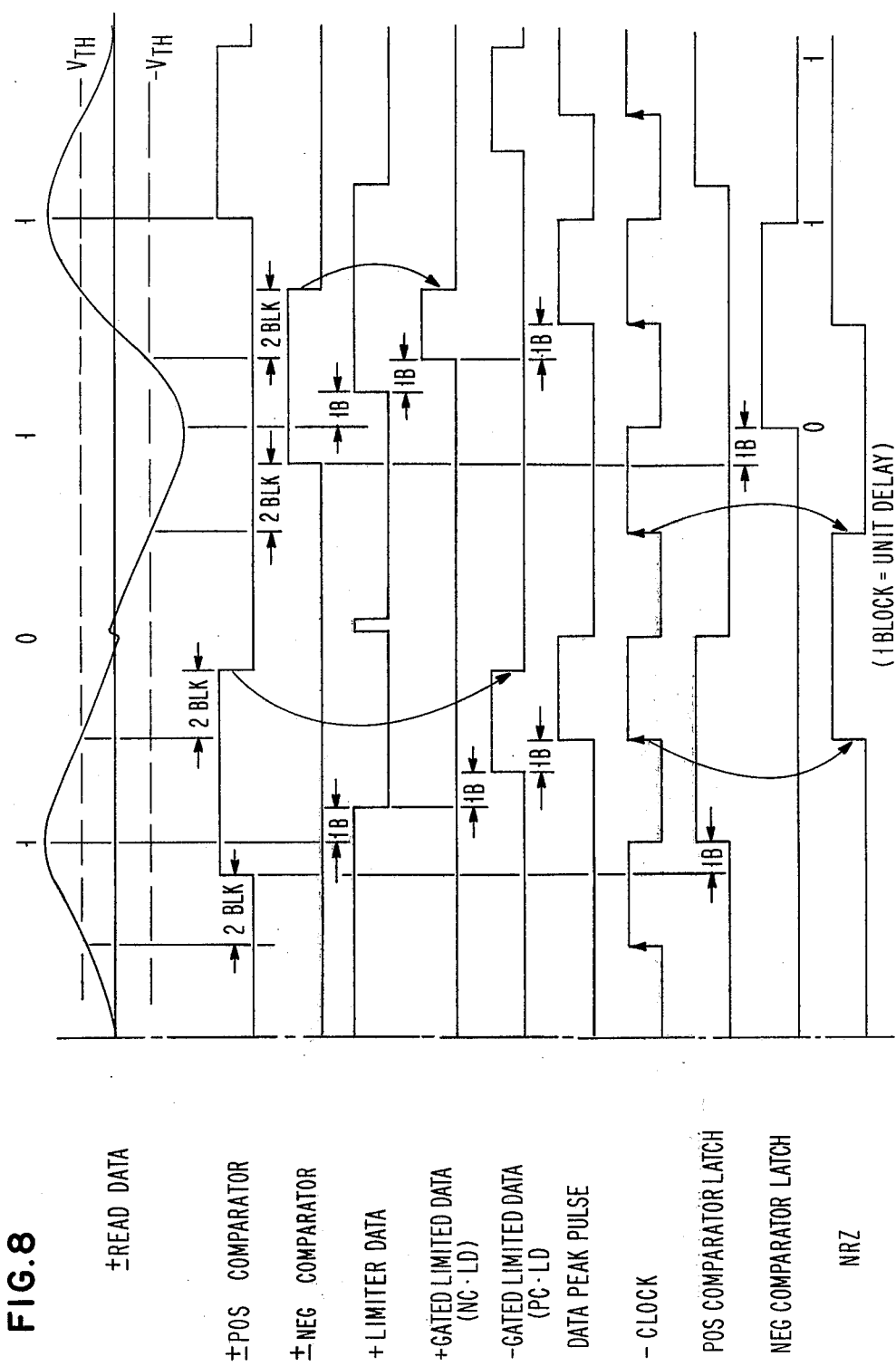

AMPLITUDE SENSITIVE THREE-LEVEL DETECTOR FOR DERIVATIVE READ BACK CHANNEL OF MAGNETIC STORAGE DEVICE

DESCRIPTION

Technical Field

This invention relates, in general, to systems for converting flux transitions on moving magnetic media to binary data and, in particular, to an improved read back system for data stored on a flexible magnetic recording medium.

BACKGROUND OF THE INVENTION

The recording channel of a flexible media disk file presents unique detection requirements which are generally not found in disk files employing rigid disks. In flexible media disk files and in magnetic tape drives, where the head is not in contact with the medium and data is stored in run-length limited NRZI code, a bandwidth limited version of the derivative of the write waveform is provided on reading. In such an environment, the detection of the read back system must be amplitude sensitive because the raw data signal provided by the magnetic transducer has three discrete levels, i.e., positive, zero, and negative. A binary amplitude detection technique, therefore, cannot be used. In addition, since the magnetic coating of flexible media is relatively more susceptible to drop-outs than rigid media, relatively large variations in amplitude are encountered. In addition, in disk files the amplitude of the read back signal will vary as a function of the linear velocity of the medium past the transducer which varies in a disk file as a function of the radial position of the head relative to the disk. Further, when the data has been recorded in a run-length limited code, the detector must be able to detect while in the presence of noise signals caused by overwriting of data on the track and, in disk files, the slight mispositioning of the moving head relative to the data track. It is also desirable in today's technology to implement the read back system in simple analog integrated circuits, which requires the signal processing techniques to be relatively simple.

SUMMARY OF THE INVENTION

The derivative read back system of the present invention provides a data detector for flexible media with good amplitude control and off-track capability that is easily implementable in integrated circuits. The system provides an accurate amplitude sensitive detector by means of an automatic gain control circuit connected to the magnetic transducer. The AGC circuit has a long time constant to track the long-term variation of the read signal and also includes a tracking threshold signal generator that follows short-term variations of the raw data signal. The tracking threshold signal is employed as a reference for the detector and is, in effect, a predetermined percentage of the amplitude of the actual peak signal. The threshold signal generator must follow peak amplitude variations rapidly and still be relatively insensitive to data patterns.

The basic concept of the detector is to compare the analog signal to an accurate threshold reference signal and determine whether the signal is positive, negative or zero. This comparison is made at the nominal peak time by means of a clock signal attained from a phase-locked loop which is synchronized to the input data by pulses developed by differentiating and limiting segments of the input signal which have been bracketed and identified as valid data peaks.

The accuracy of the detector is enhanced when the data signal is differentially summed with the reference and supplied to a differential comparator. The summing function may be done using resistive summers. To provide accurate detection at high bit rates, the system derives clock pulses from the data peaks and then accurately samples the same data peak. The above is accomplished by properly matching the signal delays in the detector channels and the clocking channel.

It is, therefore, an object of the present invention to provide an improved system for reading data stored on a flexible disk file in a run-length limited NRZ code.

Another object of the present invention is to provide an improved data detector which is adapted to be implemented in analog circuits.

A further object of the present invention is to provide an amplitude data detector system which is insensitive to the pattern of data that is recorded and read.

A still further object of the present invention is to provide a data detecting system for a derivative type signal channel which accommodates long wave-length problems of run-length limited encoding within a narrow bandwidth derivative channel.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 8 illustrates signal waveforms appearing at various locations in FIG. 7.

DESCRIPTION OF THE INVENTION

Figure 1:
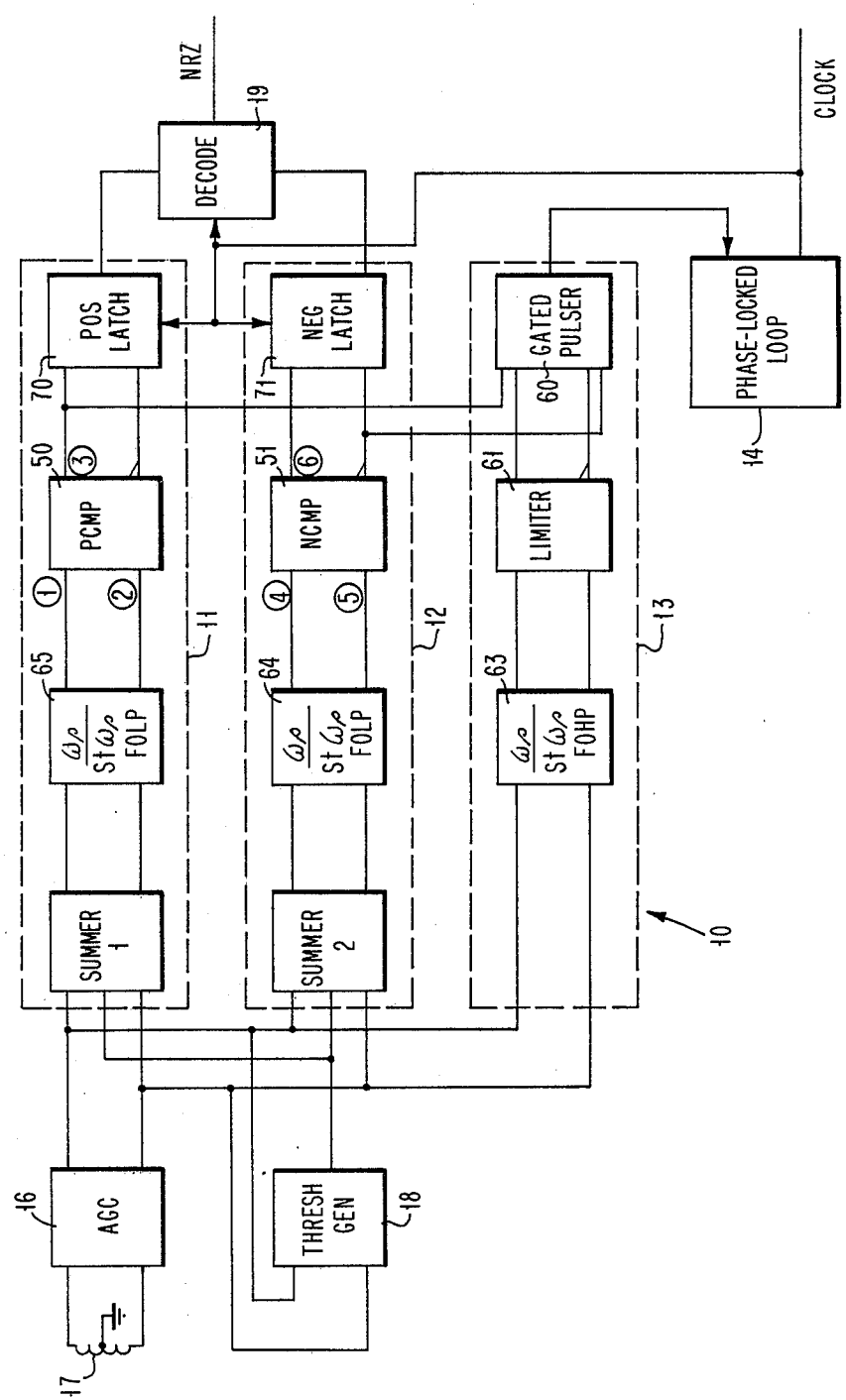
FIG. 1 is a functional block diagram of a system for reading data from a flexible disk file which embodies the present invention.

FIG. 1 is a functional block diagram of the read back system embodying the present invention. The system, as shown in FIG. 1, comprises the detector 10 which includes a positive signal detecting channel 11, a negative signal detecting channel 12, and a clocking channel 13 for providing input pulses to the phase-locked loop 14. The system further comprises an AGC circuit 16 which has its input coupled to the read head 17 through a conventional preamplifier (not shown) and provides differential output signals to channels 11, 12 and 13 and to the threshold generator 18. Generator 18 provides a reference threshold signal $V_{th}$ to the input of channels 11 and 12. The outputs of channels 11, 12 and from the phase-locked loop 14 are supplied to the data decoder 19 along with a clock signal.

Figure 2:
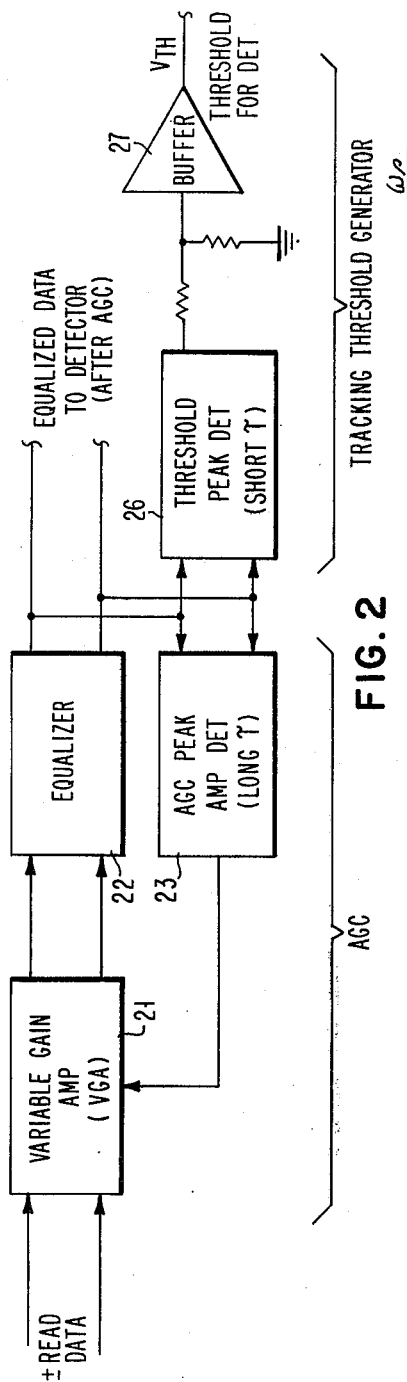
FIG. 2 is a schematic block diagram of the automatic gain control and threshold generator shown in FIG. 1.

The AGC circuit 16 and the generator 18 are shown in further detail in FIG. 2. As shown in FIG. 2, the AGC circuit includes a variable gain amplifier 21, equalizing circuit 22, and an AGC peak amplitude detector 23. Detector 23 functions to set the gain of amplifier 21 based on the average of detected peaks over a relatively long period of time. The threshold generator 18 of FIG. 1 comprises a threshold peak detector 26, threshold resistor 26R, and buffer 27. Buffer 27 provides a reference voltage $V_{th}$ which is a precise percentage of the signal peak detected by detector 26 and follows rapid changes in peak levels.

Figure 3:
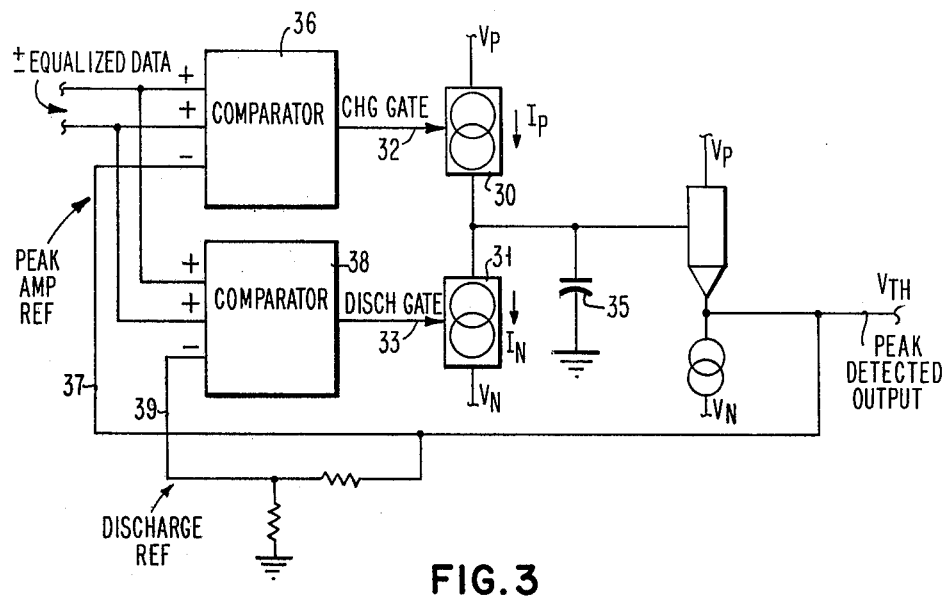
FIG. 3 is a schematic diagram of the threshold peak detector shown in FIG. 2.

FIG. 3 illustrates the details of the peak detectors 23 and 26 shown in FIG. 2. As shown in FIG. 3, the peak detector provides a voltage output $V_{th}$ which is a precise percentage of the actual peak signal amplitude of the input equalized data signal. As shown, switchable current sources 30 and 31 are controlled by a charging gate signal 32 and the discharge gate signal 33, respectively. These signals, in effect, determine the voltage on capacitor 35. Capacitor 35 charges when the signal peak amplitude applied to comparator 36 is above the value stored on capacitor 35 and fed back to comparator 36 via line 37. Capacitor 35 discharges only when the signal on capacitor 35 is above a discharge reference signal which is a predetermined percentage of the stored signal on capacitor 35. The operation of the peak detector shown in FIG. 3 can best be seen by reference to the signals shown in FIGS. 6a through 6d.

Figure 6:
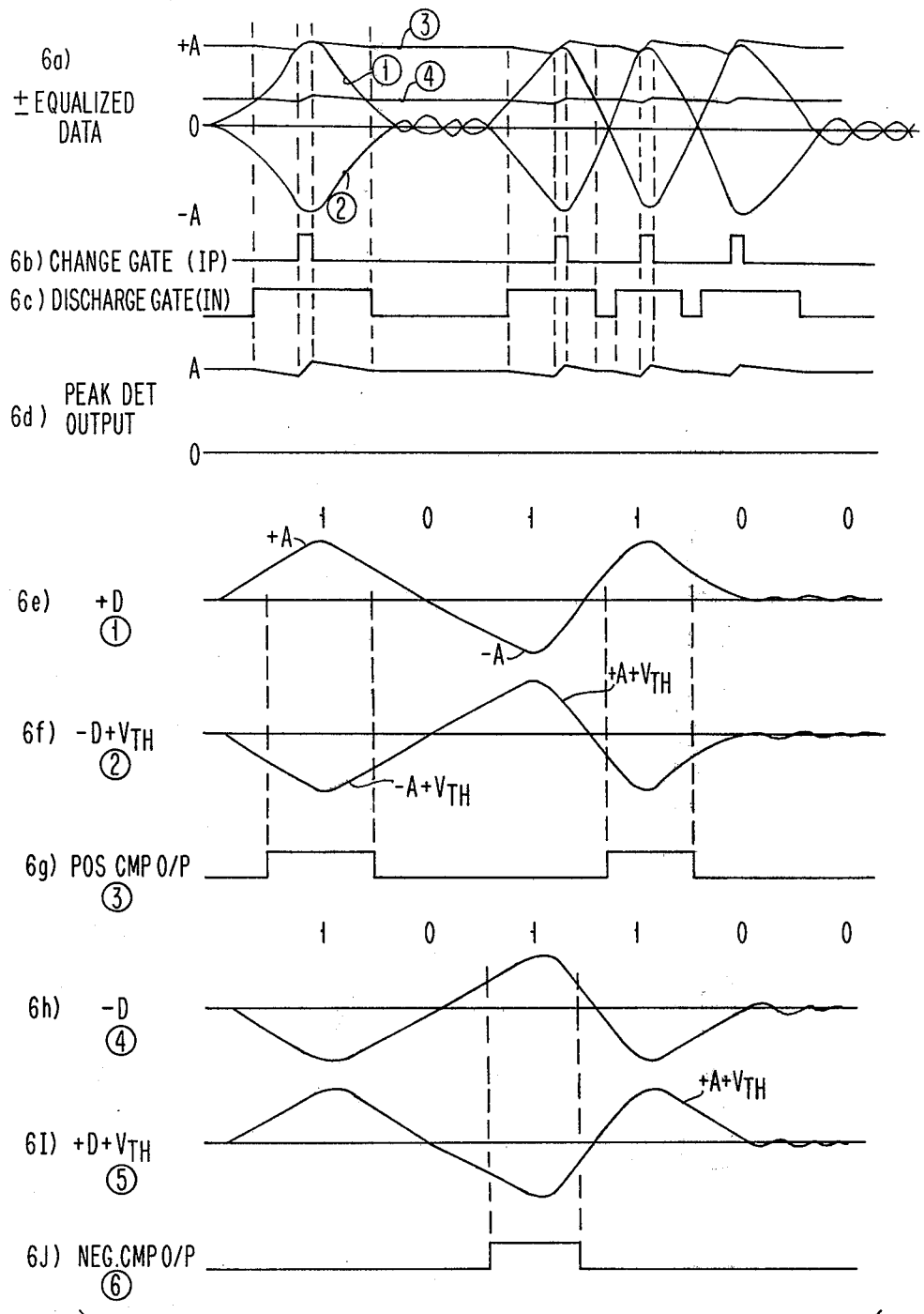
FIGS. 6a through 6j are signal waveforms which appear at various points of the system shown in FIG. 1.

As shown in FIG. 6a, signals 1 and 2 represent the differential input signal representing equalized data from the magnetic head. Signal 3 represents the peak amplitude reference signal supplied to comparator 36 on line 37. Signal 4 represents the discharge reference signal applied to comparator 38 on line 39. The charging signal on line 32 is shown in FIG. 6b, while the discharge gating signal on line 33 is shown in FIG. 6c.

Figure 5:
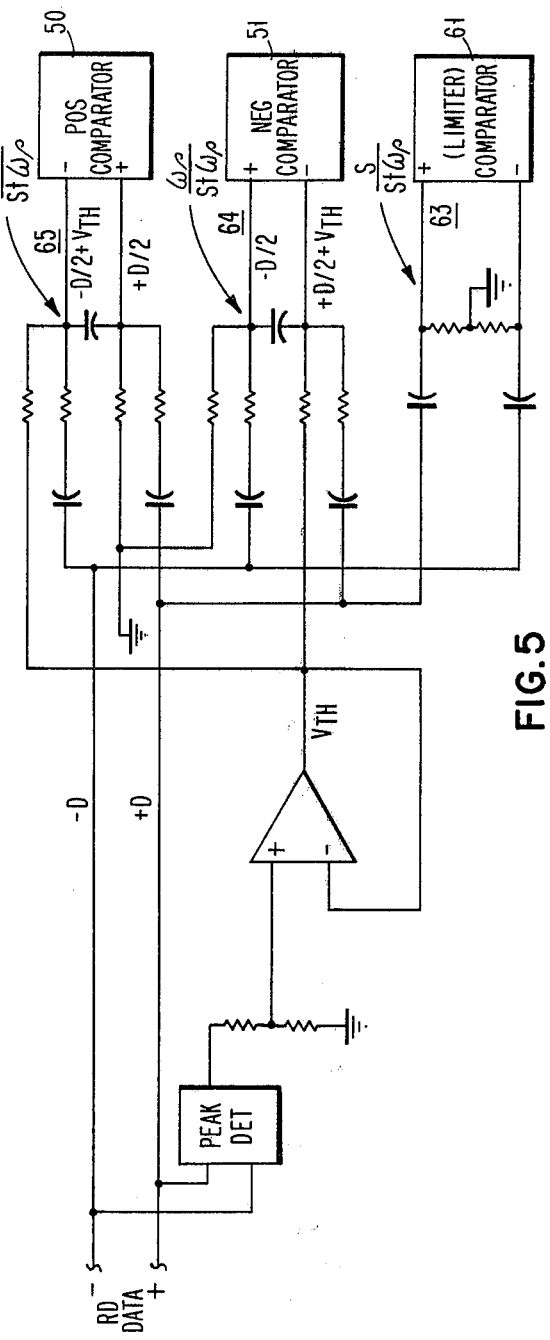
FIG. 5 is a circuit diagram of the differential summers shown in FIG. 4.
Figure 4:
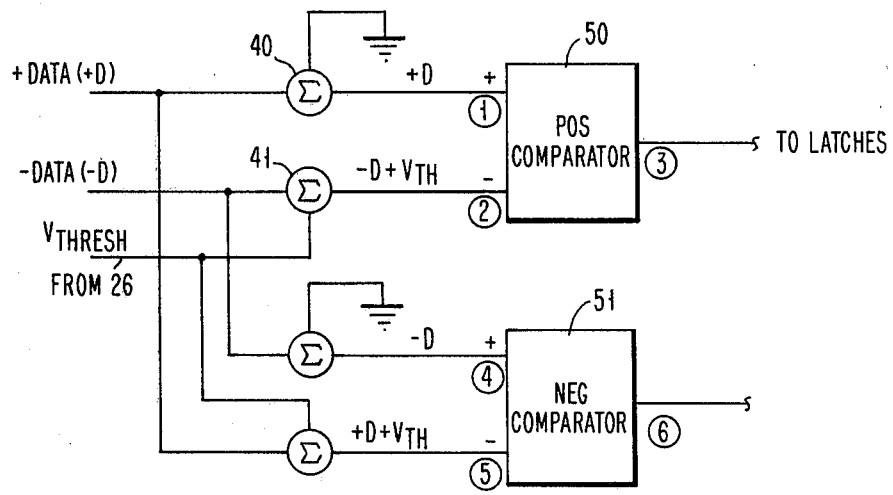
FIG. 4 is a simple block diagram of the differential summer shown in FIG. 1.

FIG. 4 is a block diagram showing the differential summers, while FIG. 5 shows an implementation of the summers employing resistors. As shown in FIG. 4, the differential data input signals +D and −D are supplied to one input of summing junctions 40 and 41, respectively. The other input of summing junction 40 is ground, while the input to junction 41 is the threshold voltage $V_{th}$ from the peak detector 26 of FIG. 2. The input to terminal A of positive comparator 50 is shown in FIG. 6e, while the input to terminal B of positive comparator 50 is shown in FIG. 6f. The output of the positive comparator is shown in FIG. 6g. FIGS. 6h through 6j show corresponding signals for the negative comparator 51 of channel 12.

The positive comparator input is the + data differentiated with a DC offset equal to the threshold reference from detector 26. The negative comparator input is the − data differentiated with the DC offset equal to the threshold reference voltage from detector 26.

The clock channel 13 provides a series of pulses which function to synchronize the phase-locked loop 14 to the raw read data. Channel 13 (FIG. 1) comprises a gated data pulser 60, a data limiter 61 and an input signal differentiator for differentiating the positive and negative equalized data signal. The output of the gated data pulser 60 is a pulse which represents the true peak of the nominal data. The differentiator provides accurate zero crossing information concerning the data peak. This is accomplished, as shown in FIG. 5, by using a first order high pass filter FOHP 63 for the input filter to the limiter 61. Similar first order low pass filters FOLP 64 and 65 are provided as input filters to the comparators 50 and 51 in channels 11 and 12.

The input to the limiter 61 will be the differentiated version of the input to the comparators 50 and 51 if the filters 63, 64 and 65 have identical poles. FIG. 5 shows one implementation of the filters and summers which have been implemented by resistors.

Figure 7:
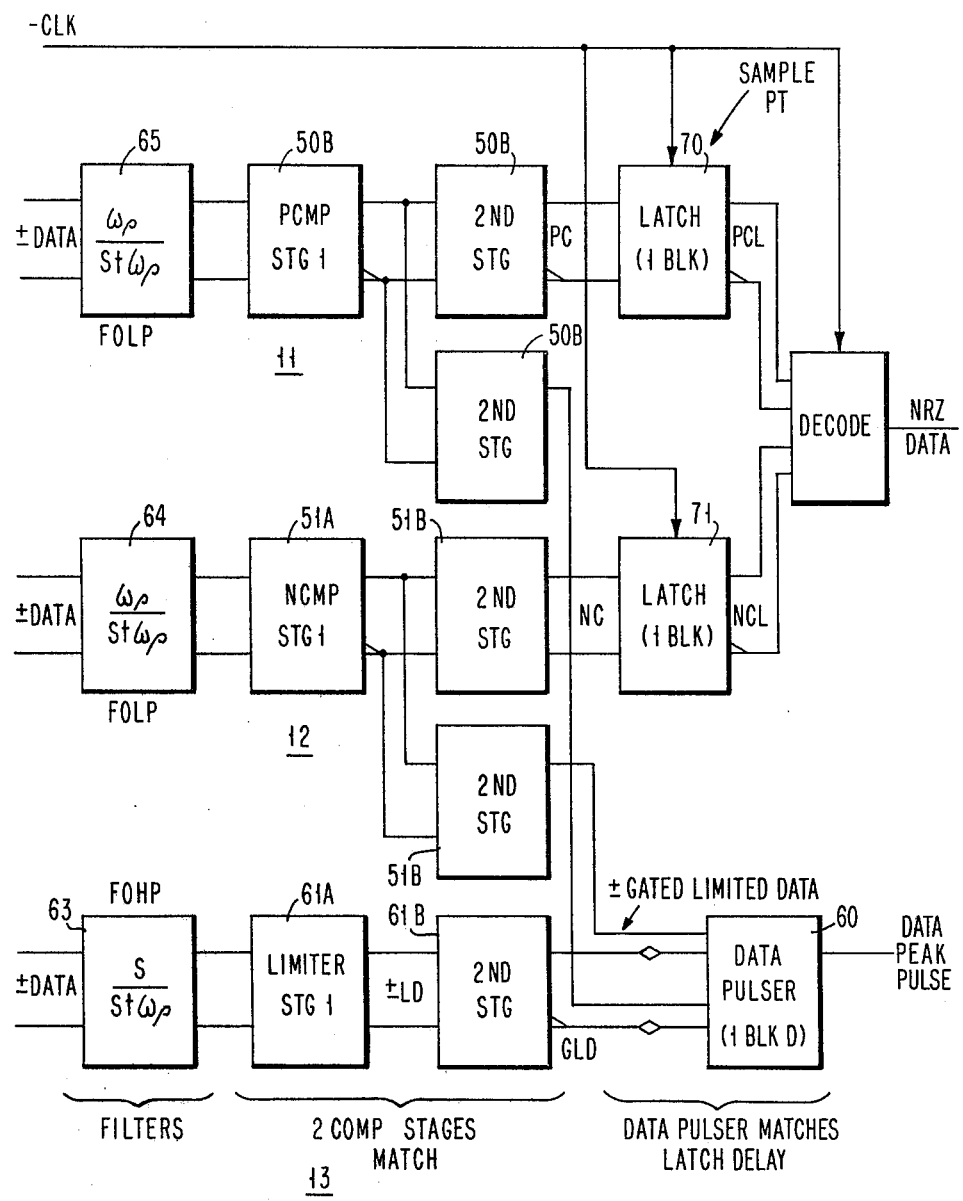
FIG. 7 is a block diagram of the system illustrating the manner in which signals are delayed equally in the system shown in FIG. 1.

To provide accurate detection at high bit rates, the clock must strobe the comparators 50 and 51 into the latches 70 and 71 at a point which represents the true peak of the nominal data. The circuits 60, 61 and 63 must derive the sync pulses from data peaks and then accurately strobe the same data peaks. This is accomplished, as shown in FIG. 7, by matching delays in the detector channels 11 and 12 with the delay in the clock channel 13. The FOLP filters 64 and 65 have delays which match the delay of the FOHP filter 63 in channel 13. Two stages of the comparators 50A and 50B and 51A and 51B match the delay of the two stages of the limiter 61A and 61B in channel 13. The data pulse generator 60 of channel 13 has a unit delay which matches the unit delay of the latches 70 and 71 of channels 11 and 12, respectively. As a result of the matched delays in the channels, the data peak pulse is aligned with the data at the sample point. Where the circuits are integrated onto a single semiconductor chip, very precise delay matching may be obtained.

FIG. 8 is a diagram showing the various signals involved in channels 11, 12 and 13 and the various delays which are achieved by the various components.

The numeric designations applied to the waveforms of FIG. 8 correspond to similar numeric designations which appear in FIG. 7 and indicate where the various waveforms in FIG. 8 appear in the circuits of FIG. 7.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A system for reading information stored on a flexible magnetic media comprising:
   (a) a magnetic transducer for providing a differential signal representing binary data stored on said flexible media;
   (b) first and second peak threshold comparators for respectively detecting positive and negative peaks of said differential signal;
   (c) an automatic gain control circuit connected between said transducer and said comparators and including a feedback loop providing a relatively long time constant for said gain control circuit compared to bit times of said binary data;
   (d) a voltage threshold generator connected to said AGC circuit for providing a reference threshold voltage to said comparators which is a precise percentage of the voltage peaks of said differential signal and which has a relatively short time constant relative to said bit times; and
   (e) clock means responsive to said input signal peaks to sample said peak detectors to establish the amplitude relationship of said input signal to said reference voltage signal.

2. The combination recited in claim 1 in which said binary data is stored in a run-length limited NRZI code.

3. The combination recited in claim 2 in which said threshold generator includes a capacitor, first and second switchable current sources for charging and discharging said capacitor, said capacitor being charged when the peak amplitude of the output of said AGC circuit is above the value stored on said capacitor, and said capacitor being discharged only when said AGC output signal is above a discharge reference level which is a predetermined percentage of the voltage stored on said capacitor.

4. The combination recited in claim 3 in which said clock means includes a phase-locked loop for providing clock signals at a predetermined nominal frequency, and means for supplying sync pulses to said phase-locked loop to phase synchronize said clock signals to said differential signal being provided by said magnetic transducer.

5. The combination recited in claim 4 in which said sync pulses ae derived by differentiating the peaks of said differential signal from said AGC circuit.

6. The combination recited in claim 5 in which said pulses derived by differentiating peaks of said differential signals from said AGC circuit are gated to the input of said phase-locked loop under the control of said first and second comparators.

7. The combination recited in claim 6 in which the signal delays from the output of said AGC circuit through said comparators is equal to the signal delay through said clock means.

\* \* \* \* \*